July 22, 1969   H. R. BUNGAY III   3,457,420
PULSE DISTRIBUTION ANALYSIS DEVICE
Filed Oct. 21, 1965   2 Sheets-Sheet 1

INVENTOR
HENRY R. BUNGAY, III

BY
Stowell + Stowell
ATTORNEYS

July 22, 1969  H. R. BUNGAY III  3,457,420
PULSE DISTRIBUTION ANALYSIS DEVICE
Filed Oct. 21, 1965  2 Sheets-Sheet 2

INVENTOR
HENRY R. BUNGAY, III

BY  Stowell + Stowell
ATTORNEYS

United States Patent Office 3,457,420
Patented July 22, 1969

3,457,420
PULSE DISTRIBUTION ANALYSIS DEVICE
Henry R. Bungay III, Blacksburg, Va., assignor to Research Corporation, New York, N.Y., a nonprofit corporation
Filed Oct. 21, 1965, Ser. No. 499,538
Int. Cl. G01n 21/30; H01j 39/12
U.S. Cl. 250—219                                 9 Claims

ABSTRACT OF THE DISCLOSURE

A device for displaying the magnitude and number of random events, such as the number-size relationship of particles passing through an aperture located in a liquid medium. A spike display of the events is formed on a screen. The screen is scanned and an output corresponding to the scanning is simultaneously applied to a delay element and to a comparator. The absolute difference of the delayed and the non-delayed signals is fed from the comparator to a strip (X-Y) plotter. On the resultant plot, the vertical dimension represents the number of particles and the horizontal dimension represents particle size.

---

This invention relates to a method and apparatus for the measurement and display of particle size distribution or of radioisotope decay energy distribution. More particularly, it relates to a method and apparatus for transforming pulse height information into a graph of pulse distribution. Appropriate treatment of the signal permits the pulse height to be correlated to particle diameter, or to particle area, or to particle volume, or in the case of radioisotope date, to decay energy.

The problems attendant the detection and subsequent or simultaneous recordation of the passage of particles through an aperture in a liquid medium have enjoyed the attention of a number of workers in this art. Certain of their contributions thereto have been set forth in, for example, the following United States patents: 2,656,508; 2,856,129; 2,869,078; 3,122,431; 3,144,773 and 3,138,029, though not all deal with recordation as well as detection.

The detection alone of the traversal of particles through an aperture is a problem which has already been more or less satisfactorily solved, as may be seen by reference to the preceding mentioned U.S. Patent 2,656,508 to Wallace H. Coulter. Nevertheless, the problem of recording their passage in an inexpensive and speedy manner has not been solved in an altogether satisfactory way. Various methods and schemes are known in this art for the recording of such distributional information. Such a plot of this aperture-traversal information would show the relationship between (1) the relative sizes (in some cases the absolute sizes) of the particles and (2) the number of particles of a certain relative (or absolute) size. Preferably, any method or scheme for accomplishing this recordation should not only be rather simple but should employ components which are readily available on the open market as standard items of manufacture and hence possess a substantial degree of reliability of performance.

According to the practice of the present invention, the output in the form of electrical pulses of varying magnitudes from a particle counter, such as that shown in U.S. Patent 2,656,508, is fed to an amplifier and thence to an oscilloscope. Attendant the passage of each particle, or of each group of particles, through the aperture of the particle counter, a vertical spike or trace appears on the oscilloscope screen whose height thereof corresponds to the volume (size) of the particle. An optical system scans this display on the oscilloscope screen and translates the information defined thereby into a continuous distribution curve by means of a conventional X-Y plotter or strip chart recorder.

In view of the above, the reader is now in a position to recognize that the invention broadly relates to the transformation of information concerning the random passage of random sized particles through an aperture or random decay of isotopes from the form of discrete pulses of varying magnitudes to the form of a continuous and readily visualized curve. The curve, generated or produced by a conventional plotting device, thus exhibits the desired distributional information rapidly and on a permanent record. The invention may further be regarded as a pulse (pulses from a "Coulter aperture") to analog (continuous curve) convertor and hence exhibits utility in other pulse to analog display systems, such as displaying a pulse height distribution for mixtures of radioisotopes each having different decay energies (different half-life durations).

Figure 1:
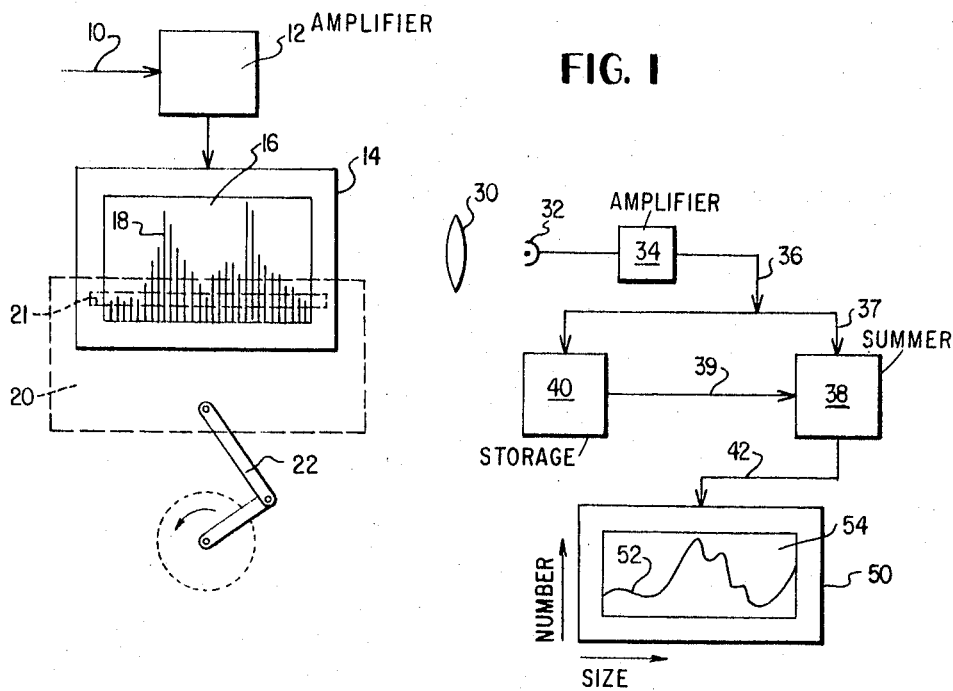
FIGURE 1 is a partially schematic view of the apparatus employed for the practice of this invention for obtaining a continuous curve showing a particle size versus number of particles distribution for a plurality of particles passing through an aperture or other stationary reference point.

Referring now to FIGURE 1 of the drawings, the numeral 10 denotes generally the output from a particle counter, such as, by way of example, a particle counter of the type shown in the U.S. Patent 2,656,508, the details of which form no part of this invention. It will be understood that the invention is not limited to this specific type of counter and, further, that the output 10 may be regarded as the quantization of any one of a great number of physical events. It is sufficient for an understanding of the present invention to recognize that the output 10 from the particle counter consists of a plurality of discrete electrical pulses, occurring in practice in rather rapid sequence, the magnitude of each being linearly related to the size (volume) of the particle which produced or generated it in the particle counter.

The numeral 12 denotes generally an amplifier of suitable construction for amplifying the signal 10. The numeral 14 denotes an oscilloscope of conventional construction having a display screen 16. The numeral 18 denotes any one of a plurality of vertical traces or, synonymously, spikes which appear on screen 16 of the oscilloscope 14. The vertical height of each spike 18 is proportional to the volume of the particle which produced it in the particle's passage through the aperture in the particle detecting device.

The numeral 20 denotes a generally planar and rectangular opaque mask having a horizontal slit 21. By means of suitable guides, the mask is constrained to move vertically upwardly and downwardly under the influence of a mechanical linkage denoted generally by numeral 22. It will be understood that while the linkage 22 is shown in the rather simple form of two pivoted levers with one crank being rotated about a fixed axis and the other fixed to the mask, the linkage mechanism 22 is preferably one which will move the mask 20 up at a constant velocity so that the projected area of slit 21 traverses equal areas of the display screen 16 in equal time intervals.

The numeral 30 denotes a lens positioned in front of the screen 16 with the mask 20 positioned generally parallel to the screen 16 and between it and lens 30. The amount of light passing through slit 21 from screen 16 is proportional to the total area of the spikes 18 and is collected by lens 30 and focused on a conventional photocell 32. The photocell converts light energy into electrical energy. The numeral 34 denotes an amplifier of conventional construction for amplifying the electrical output of photocell 32. The numeral 36 denotes the amplified output from photocell 32 and is fed into two elements, 38 and 40. Element 38 is a device which sums, algebraically, the two inputs fed into it. The two inputs are denoted by the numerals 37 and 39, the numeral 37 denoting the direct output from the amplifier 34 and the second input 39 representing the output from a time delay element 40. The element 40 is of such construction that its input (from amplifier 34) is delayed a predetermined time and also is reversed in electrical polarity before appearing as its output 39. Thus, for example, if output 36 were plus five volts the output 39 would be minus 5 volts and would be delayed a predetermined time before appearing as input 39 to summing element 38. The net output denoted by the numeral 42 from summer 38 is therefore the algebraic sum of the two inputs 37 and 39.

The numeral 50 denotes a conventional strip plotter adapted to trace out a continuous curve or line 52 on a sheet 54. Preferably, the upward motion of the mask 20 is linked to the horizontal motion of the sheet or strip 54, for a reason which will presently be apparent. Those familiar with this art will recognize that the major electrical components above described, such as the time delay element 40 and the summer 38, are standard items of manufacture and are generally available in the market place as offered by a variety of manufacturers.

In order to fully demonstrate how the information displayed on screen 16 in the form of a plurality of spikes 18 is translated or transformed into the form characterized by curve 52, an explanation of FIGURES 2 through 9 inclusive will now be set forth.

Figure 2:
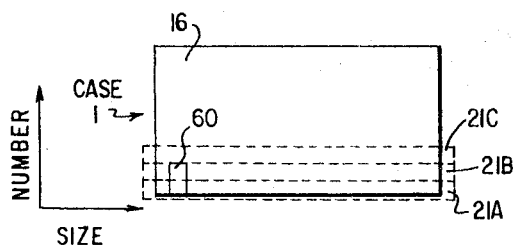
FIGURES 2 through 9 are representations of certain particle distributions which may occur and illustrate the mode of operation of the apparatus shown in FIGURE 1.

Referring now to FIGURE 2 of the drawings, the numeral 60 denotes a spike whose vertical dimension corresponds to a particle size (diameter) of, for example, 10 microns. This trace or spike 60 is shown as appearing on screen 16 of the oscilloscope. Let it be assumed, for the purposes of explanation, that only a single particle has traversed the aperture in the particle counter and this is registered as spike 60. The trace 60 will persist for a certain length of time on the screen 16 and further, also for the sake of explanation, let it be assumed that the persistence time of such duration that spike 60 will remain on screen 16 for the length of time required for slit 21 of mask 20 to move from its lowermost to its uppermost position. Assume further that initially the slit 21 is at the bottom of screen 16, this position being denoted by the numeral 21A of FIGURE 2, and at this particular instant of time some of the light from spike 60 passes through slit 21 and is collected by lens 30 and focused on photocell 32. Assume further that after amplification by amplifier 34, the amplified photocell output 36 corresponding to that exposed portion of spike 60 through slit 21 is 10 millivolts (10 mv.).

Assume that 100 milliseconds later, the slit 21 has moved upwardly to the position denoted by the numeral 21B, at which position the same spike area is exposed through slit 21, as was exposed in position 21A. Assuming that the element 40 is set for a time delay of 100 milliseconds, at the end of the first 100 millisecond period (the time taken for the slit 21 to move from position 21A to 21B) the net output of summer 38 will be zero. This zero sum represents the direct plus 10 mv. arriving at the summer 38 and 37 when the slit is in position 21B compared with delayed signal of 10 mv. which was generated when the slit was in position 21A, changed to minus 10 mv. by element 40.

Figure 3:
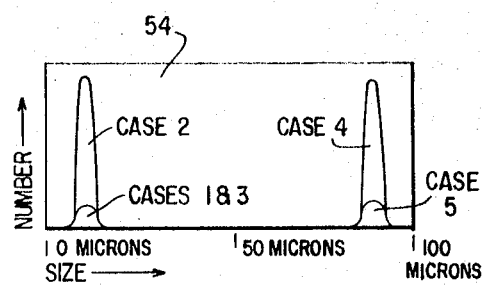

Assume now that after the next 100 milliseconds interval, the slit 21 is at position 21C. The direct output 37, at position 21C, will be zero, since slit 21 is now above the top edge of spike 60. The delayed output 39 at this time will be minus 10 mv., being the 10 mv. output generated at position 21B. Summer output 42 will be minus 10 mv. The algebraic sign makes no difference and the plotter 50 will plot a vertical distance corresponding to the 10 mv. signal. This is shown in FIGURE 3 in the figure marked Case 1. At all subsequent split positions above position 21C, all inputs to summer 38 will be zero and no further plotting will occur.

Figure 4:
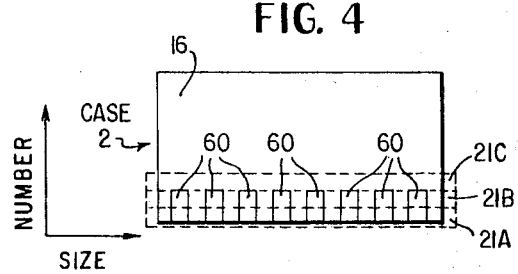

Referring now to FIGURE 4 of the drawings, let it be assumed that a plurality of particles, each of 10 micron size, has passed through the aperture in the particle counter. Following the same mode of explanation given with regard to FIGURE 2, assume initially that slit 21 is in the lowermost position denoted by the numeral 21A. At this time, the light output of screen 16 passing through slit 21 from the plurality of spikes 60 (being of the same height as shown in FIGURE 2 because the particles are of the same assumed size) will now be greater because there are more spikes 60. Assume that the brightness of the combined spikes 60 of FIGURE 4 yields, after amplification by amplifier 34, an output 36 of 80 mv. After a 100 millisecond interval, slit 21 will have moved to position 21B. The direct signal of 80 mv. fed into summer 38 from line 37 will at this instant of time be plus 80 mv. while the output 39 from time delay element 40 will be minus 80 mv. (the delayed signal corresponding to position 21A) and the net output 42 from the summer 38 will be zero.

Consider now the next interval of 100 milliseconds, being the time taken to go from position 21B to 21C. At the time corresponding to position 21C, the light output from screen 16 through slit 21 will be zero, no light passing therethrough since the mask has by this time obscured all spikes. The direct input 37 to summer 38 will be zero, while the delayed input 39 from time delay element 40 will just now be feeding in the minus 80 mv. input corresponding to position 21B. The net output 42 will then be proportional to the 80 mv. signal and the plotter 50 will make a plot denoted by Case 2 of FIGURE 3.

It will be observed from a comparison of Case 1 and Case 2 of FIGURE 3, that both occur towards the left portion of sheet 54 of plotter 50, this conveniently being scaled from a particle size corresponding to zero at the very left to a maximum particle size, say 100 microns, at the extreme right. It will be observed that both Case 1 and Case 2 occur at the same distance along an imaginary x-axis of sheet 54 and the difference is in their height. Thus, the vertical dimension of the plot on sheet 54 is proportional to the number of particles while the horizontal position thereof is proportional to the size of the particles.

Figure 5:
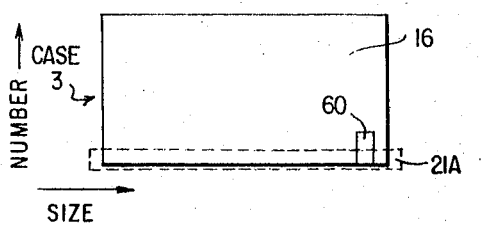

From a consideration of the explanation given with regard to FIGURE 2 and FIGURE 4, the reader will readily appreciate that the situation depicted in FIGURE 5 of the drawings is one wherein a particle of, for example, 10 microns size, has passed through the aperture of the particle counter but appears in the right portion of the screen 16. This simply means that the particle traversed the aperture in the particle counter later in time than the traversal represented in FIGURE 2. Further with regard to the above explanation, it will be recognized that the plotter 50 will plot the same thing as it did with regard to FIGURE 2 (Case 1) since it is only differences in total spike area which appear through slit 21 of mask 20 which are significant. This assertion follows from the described character of time delay element 40 and its mode of cooperation with output 36 and summer 38.

Figure 6:
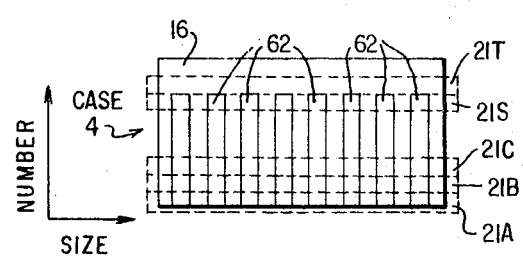

Referring now to FIGURE 6 of the drawings, a situation is depicted representing the passage of a plurality of particles through the aperture in the particle detector wherein each is of uniform size and is, for example, 90 microns (in diameter). With the passage of each of these 90 micron diameter particles through the aperture, a spike 62 appears on screen 16 of a greater height than spike 60. Initially, let it be assumed that the slit 21 is in the position 21A of FIGURE 6 and the light from the spikes passing through slit 21 gives rise to an output from amplifier 34 of 80 mv. At the end of the first 100 millisecond interval, the slit 21 is in position 21B and at this time the direct output 37 to summer 38 is 80 mv. The input 39 from time delay element 40, corresponding to the position 21A is also 80 mv. but of opposite polarity. These outputs are summed algebraically by summer 38 and the output 42 to the plotter 50 is zero.

This situation, i.e., zero net output to plotter 50, will obtain throughout the upward displacement of slit 21 until the position 21T is reached. At the instant of time corresponding to position 21T, the direct output 37 will be zero (the tops of spikes 62 now being behind mask 20), while the delayed output 39 will be 80 mv. The net output 42 is therefore 80 mv. and the plotter will plot a curve denoted by Case 4 of FIGURE 3.

Figure 7:
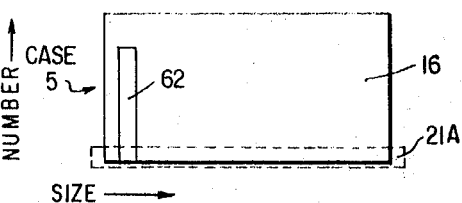

Referring now to FIGURE 7 of the drawings, assume that a single particle of 90 microns diameter has passed through the aperture in the particle detector and gives rise to a single spike 62. Assume further that the output 36 is, as before, 10 mv. In view of the explanation given with regard to FIGURES 2 and 6, it will be seen that the recordation of this spike 62 by the plotter will occur late in the period of vertical travel of slit 21 over screen 16 and the recordation will be made in FIGURE 5 as denoted by Case 5. Since the spike area visible to phototube 32 through slit 21 of single spike 62 is less than the total spike area through slit 21 depicted at 21A–21S FIGURE 6, it will be seen that the height of the plot from plotter 50 will be much lower than occurred in FIGURE 6. However, assuming the spikes of FIGURES 6 and 7 to have been of the same height, they will necessarily occur at the same x-axis distance along sheet 54.

Figure 8:
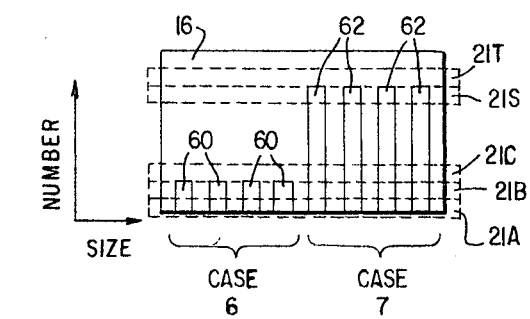

Referring now to FIGURE 8 of the drawings, a situation is depicted wherein in the interval of time corresponding to the time required for slit 21 to traverse the entire vertical distance across screen 16, a plurality of particles of two different sizes, for example, 10 microns and 90 microns, traverse the aperture. This will give rise on screen 16 to two types of spikes, types 60 and 62. The spikes 60 correspond to the passage of the smaller particles and the spikes 62 correspond to the passage of the larger particles. At positions 21A and 21B of slit 21, the direct output 37 will be of a magnitude of, for example, 80 mv.

From the above explanation, the reader will now comprehend that at slit position 21C, there will be a difference of 40 mv. output to plotter 50. The plotter will then plot a curve denoted by Case 6 at FIGURE 9.

From position 21C to position 21S there will be no change in light quantity passing through slit 21 due to the presence of spikes 62 on screen 16. In passing from position 21S to 21T there will be a change in light intensity due to the eclipsing of the tops of spikes 62 by the mask 20 and this eclipsing, in view of what has been said before, will result in a change of 40 mv. and this will be plotted by the plotter as Case 7 of FIGURE 9. This plot is shown at the right portion thereof.

Figure 9:
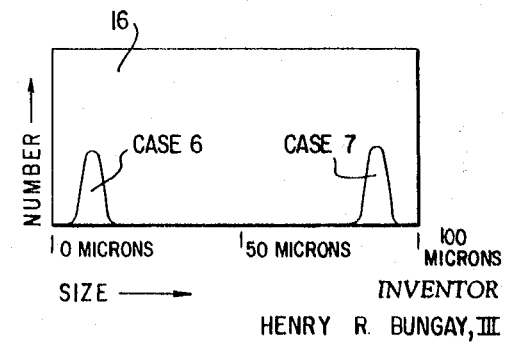

The plots shown at FIGURE 9 will be the same, no matter what the distribution of spikes 60 and 62 in FIGURE 8. Thus, if the sequence of passage of the two sizes of particles depicted at FIGURE 8 (10 and 90 microns) were to be randomly interspersed, i.e., with a spike 62 followed by two spikes 60, followed by three spikes 62, followed by one spike 60, etc., the same plot would be made. This is because, as before emphasized, it is only differences in light quantity which are significant.

By way of recapitulation of FIGURES 2 and 9 inclusive, the reader will recognize that the system shown in FIGURE 1 of the drawings will yield a continuous curve 52 whose height at any given point corresponds to the number of particles which are detected as they pass the aperture in the particle detector, while the distance along the x-axis corresponds to the size of the particles. This follows from the fact that the spikes representing small particles are eclipsed early in the upward mask travel while large particles give rise to a change in light quantity near the end of the upward motion of slit 21. By means of simple circuitry, no plots are made during downward travel of slit 21, and no plotting is made during the first time interval, i.e., the first 100 millisecond interval in the examples given. Further, it will apparent that the time required to move the slit 21 between its vertical extremes is the time required for the plotter 50 to move between its horizontal extremes. It should be pointed out that in actual operation, a number of oscilloscope traces will be presented during each traverse of the mask. These traces are definitely not identical since pulses arrive randomly. However, the traces will change about a certain statistical mean, and the photocell associated circuits will have electrical capacitors to average out these fluctuations.

Figure 10:
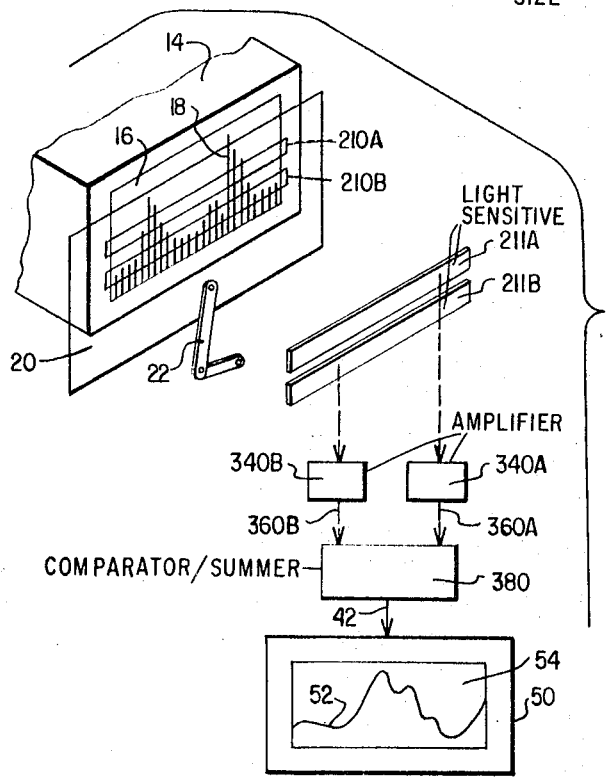
FIGURE 10 is a partially schematic fragmentary view of another embodiment of the invention.

Referring now to FIGURE 10 of the drawings, a modification of the invention is illustrated wherein the vertically moving opaque mask 20 is provided with two slits 210A and 210B. The mask 20 carries two elongated elements 211A and 211B which are positioned, respectively, contiguous to their respective slits 210A and 210B. Each element 211 carries a photocell which receives and is energized by all the light coming from its respective slit. The output from each of the elements 211 is fed to amplifiers 340A and 340B, the outputs of the latter being denoted, respectively, by 360A and 360B. These outputs are fed to a voltage comparator 380, similar to the summer 38 of the previously described embodiment. The output from the comparator 380 is denoted by the numeral 42, as before, and is fed to the plotter 50, also as before.

During the operation of this embodiment, as the mask 20 begins its vertical travel across the face 16 of the oscilloscope 14, the reader will observe that the upper slit 210A precedes the lower slit 210B. In the event that there is no change in the quantity of light from the vertical spikes 18 passing through slits 210A and 210B, the outputs 360A and 360B which are fed to the comparator 380 will be identical and the output 42 from the comparator will be zero. In such a case, the plotter 50 will not plot anything. Assume now that, during the upward motion of the mask 20, the top slit 210A rises above the tops of several of the vertical spikes 18. This will result in a diminution or lessening of the quantity of light from the vertical spikes which passes through the slit 210A relative to the quantity of light which passes through 210B. This will result in a lesser voltage from the photocell in element 211A compared to the voltage generated by the photocell in 211B. Consequently, the inputs 360A and 360B to the comparator 380 will be different and, as before, this difference will appear as the ouput 42 to the plotter 50.

From this description of the embodiment illustrated in FIGURE 10, the reader will observe that the vertical displacement of the slits 210A and 210B results in a comparison of the total light passing through the slits 210, both being of equal areas, to produce the same end result as that described with the embodiment illustrated in FIGURE 1 of the drawings. Here, by virtue of the employment of a photocell in each of the elements in 211A and 211B, the requirement for the time delay element 40 of the embodiment of FIGURE 1 is abrogated. In the practice of this second embodiment of the invention, care must be taken to select the two photocells in the elements 211A and 211B so that they are identical in electrical output from identical optical inputs, i.e., they both possess the same response curves. In the event that the response curves are slightly different, the amplifiers 340A and 340B, or more particularly one of them, are adjusted so that equal light intensity will produce equal electrical outputs 360A and 360B.

Still another embodiment employs the two slit modification but with a rapidly alternating mirror so that the one photocell receives first the light from one slit and then the light from the other. This eliminates the need for matched photocells, but instead requires switching circuits synchronized with the mirror so that the computing circuits can distinguish the signals.

It is recognized that the signal going to the plotter can be treated in various ways to change the form of the displayed information. For example, the signal can be squared and multiplied by appropriate factors to display the area of spherical particles ($4\pi r^2$) or cubed and multiplied to give the volume ($\tfrac{4}{3}\pi r^3$).

Those familiar with this art will readily recognize that, with respect to all embodiments described above, the oscilloscope trace, i.e., the spike display, may be electrically moved in lieu of the vertical movement of the mask 20. For example, referring to FIGURE 8, assume the mask and its slit 21 to be fixed relative to the oscilloscope screen 16, with the slit located at position 21A. By means of well known electrical techniques, the spike display on the screen 16 may be moved downward relative to the screen. This causes a relative motion between the slit 21 and the spike display which is completely equivalent to the relatvie motion occuring when the spike display is stationary and the slit 21 moves upwardly. By means of the above mentioned electrical techniques, the rate of movement of the spike display relative to the slit 21 may be made the same as the rate of movement of the mask 20 relative to the screen 16.

What is claimed is:

1. A method of displaying information about randomly occurring events including the steps of:
   (a) sensing events and converting them to a display, said display having a finite persistence time,
   (b) moving said display relative to and across an optical aperture,
   (c) continuously converting light passing through the aperture from the display into signals,
   (d) continuously delaying the signals for a predetermined time,
   (e) continuously obtaining the difference between delayed and non-delayed signals,
   (f) continuously plotting the difference.

2. A method of displaying information about randomly occurring events including the steps of:
   (a) sensing events and converting them to a display, said display having a finite persistence time,
   (b) moving said display relative to and across two optical apertures of fixed areas, said apertures being spaced from each other along an axis parallel to the direction of relative motion,
   (c) continuously converting light passing through the apertures into, respectively, two signals,
   (d) continuously obtaining the difference between the said two signals,
   (e) continuously plotting the difference.

3. A method of displaying information about randomly occurring events including the steps of:
   (a) continuously sensing events and converting them to a display of finite persistence time on a screen, the magnitude of an event determining the magnitude of an individual display on the screen,
   (b) continuously sensing the amount of light from a band segment moving across the screen,
   (c) continuously converting the light from the moving band into a continuously varying signal, the magnitude of said signal being proportional to the quantity of the light falling on the band,
   (d) continuously delaying the signal for a predetermined time,
   (e) continuously obtaining the difference between delayed signal and non-delayed signal,
   (f) plotting the difference.

4. A particle size distribution apparatus including: means for converting electrical pulses of varying magnitudes into optical spike pulses of correspondingly varying magnitudes into a display on a screen, an opaque mask having a slit, means for moving said slit relative to said screen and generally parallel thereto, means for converting light passing through said slit into an electrical signal, means for continuously delaying for a finite length of time said signal, means for obtaining the difference between non-delayed and delayed signals, and means for making a two-dimensional plot, one of the dimensions thereof being proportional to said difference.

5. A particle size distribution apparatus including: means for converting electrical pulses of varying magnitudes into optical display areas of correspondingly varying magnitudes, two light sensitive elements spaced from each other and movable relative to and across said display, the direction of relative motion being generally the same as an axis from one to the other of the light sensitive elements, each light sensitive element adapted to convert light from sub-areas of said display into an electrical signal to thereby generate two electrical signals, means for obtaining the difference of said signals, and means for making a two dimensional plot, one dimension thereof being proportional to said difference.

6. A particle size distribution apparatus including: means for producing an information dsplay, means for producing a first electrical signal proportional to the quantity of light emitted from a first sub-area of said display, means for producing a second electrical signal proportional to the quantity of light emitted from a second sub-area of said display, means for moving said sub-areas relative to the said display generally along an axis connecting the sub-areas, means for providing an electrical output proportional to the difference between said first and said second electrical signals, means for producing a two dimensional plot with one dimension thereof being proportional to the said difference.

7. The apparatus of claim 6 wherein said first and second sub-areas of said display are defined by the projections of different portions respectively of the display on two photocells movable over and across said display.

8. The apparatus of claim 6 wherein said first and second sub-areas are defined by the projection of portions of the display, at different times, through a single aperture in an opaque mask moving relative to said display.

9. A particle size distribution apparatus including: means for producing an information display, a photocell, means for alternately directing light from two sub-areas of said display to said photocell, means for obtaining the difference of the electrical outputs from said photocell corresponding to the alternate illuminations of said photocell by said sub-areas, means for moving said sub-areas relative to said display generally along an axis connecting the sub-areas, and means for producing a two dimensional plot with one dimension thereof being proportional to said difference.

References Cited

UNITED STATES PATENTS

| | | | |
|---|---|---|---|
| 2,463,534 | 3/1949 | Hawkins | 250—219 |
| 2,624,848 | 1/1953 | Hancock et al. | 250—219 |
| 2,674,916 | 4/1954 | Smith | 88—14 |
| 2,848,921 | 8/1958 | Koulikovitch | 250—232 X |
| 2,987,706 | 6/1961 | Honeiser | 250—217 |
| 3,088,036 | 4/1963 | Hobbs | 250—217 |

WALTER STOLIVEIN, Primary Examiner.

U.S. Cl. X.R.

250—222